United States Patent [19]

Zimmermann

[11] 4,378,623
[45] Apr. 5, 1983

[54] PROCESS AND APPARATUS FOR THE PRODUCTION OF DISC WHEELS MADE OF SHEET METAL, PARTICULARLY LIGHT SHEET METAL

[75] Inventor: Theo Zimmermann, Konigswinter, Fed. Rep. of Germany

[73] Assignee: Lemmerz-Werke KGaA, Konigswinter, Fed. Rep. of Germany

[21] Appl. No.: 240,487

[22] Filed: Mar. 4, 1981

[30] Foreign Application Priority Data

Mar. 7, 1980 [DE] Fed. Rep. of Germany ....... 3008738

[51] Int. Cl.$^3$ .......................... B21H 1/02; B21K 1/32; B23P 11/02
[52] U.S. Cl. .................................... 29/159.01; 29/446; 29/802
[58] Field of Search ............. 29/159 R, 159.1, 159.01, 29/802, 446, 508, 515; 301/63 R

[56] References Cited

U.S. PATENT DOCUMENTS

| | | | |
|---|---|---|---|
| 1,748,452 | 2/1930 | Martins | 29/159.01 |
| 2,354,439 | 7/1944 | Brink | 29/159.01 |
| 3,108,838 | 10/1963 | McCleary | 29/159.01 |
| 3,143,377 | 8/1964 | Bulgrin et al. | 301/63 R |
| 3,286,338 | 11/1966 | Bohr | 29/446 |
| 3,530,717 | 9/1970 | Gregg | 29/159.1 |
| 3,800,600 | 4/1974 | Chapin | 29/159.01 |
| 3,855,837 | 12/1974 | Philipp | 29/159.01 |
| 3,859,704 | 1/1975 | Nasson | 29/159.01 |
| 4,074,408 | 2/1978 | Davis | 29/159.01 |

FOREIGN PATENT DOCUMENTS

| | | | |
|---|---|---|---|
| 2314838 | 1/1977 | France | 301/63 R |
| 443362 | 12/1948 | Italy | 301/63 R |

Primary Examiner—Lowell A. Larson
Attorney, Agent, or Firm—Body, Vickers & Daniels

[57] ABSTRACT

Process and apparatus for assembling a wheel rim and dish with a press fit wherein the abutting surfaces are of clean, unscored metal ready for subsequent welding. The rim and dish have relatively mating diameters, either over or undersized, which can be assembled without deformation and the rim and dish are then radially deformed into a press fit relationship. When the members are assembled, no lubricant is required on the surface to assemble which would interfere with welding and there is no deformation of the metal which would later cause stress cracks.

5 Claims, 1 Drawing Figure

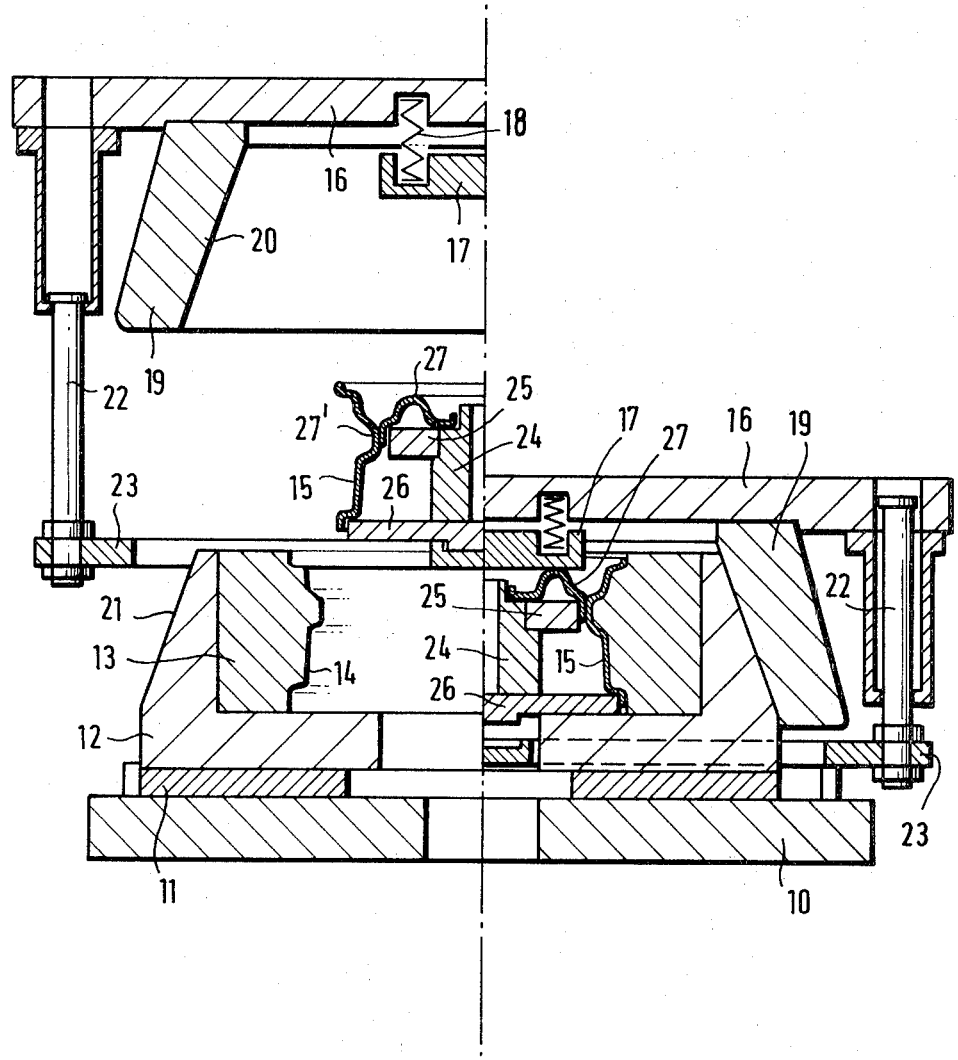

PROCESS AND APPARATUS FOR THE PRODUCTION OF DISC WHEELS MADE OF SHEET METAL, PARTICULARLY LIGHT SHEET METAL

The invention relates to a process and to apparatus for joining together rims made of sheet metal, particularly light sheet metal, and their wheel dishes into disc wheels, by obtaining a press fit between the wheel dish into the rim and subsequently welding said wheel dish to the rim.

BACKGROUND

It is known to produce disc wheels of steel from two parts by pressing a wheel dish made oversize in respect of the inside diameter of the well base of the rim into the well base of the rim which has been calibrated, ready for fitting, by expanding or upsetting, and by subsequently welding the two parts to one another.

Furthermore, it is known to subject complete disc wheels, after the welding of the rim and wheel dish, to a subsequent trueing operation by bending, expanding or upsetting and, if appropriate, to additional machining, in order to improve the concentric and planar running of the wheel made from cold-worked parts. This is generally carried out in such a way that, by means of plastic working of the wheel contact region of the wheel dish and/or of the two rim shoulder parts (tyre seating faces), with mutual influencing of these two axial and radial reference planes, the geometrical variations are permanently reduced (German Auslegeschrift 1,909,353; German Offenlegungsschrift 2,221,210; German Offenlegungsschrift 2,224,027; German Offenlegungsschrift 2,224,109; and, German Offenlegungsschrift 2,314,858).

It is also known to expand or upset the rims of cast disc wheels for the purpose of producing an exact geometrical shape (German Auslegeschrift 2,442,785).

The energy-saving measures of vehicle manufacturers also include savings of weight on the motor vehicle. The manufacture of disc wheels made of light sheet metal is suitable here, since a weight reduction of approximately 40% in comparison with the conventional steel disc wheels is to be achieved thereby. In particular, however, considerable difficulties arise in the production of such wheels of light sheet metal according to the same processes practiced hitherto in the production of wheels made of sheet steel. Although an oiled or greased light-metal wheel dish can be drawn into the rim without excessive scoring, a strong pore formation occurs, during welding, as a result of the harmful hydrocarbon lubricants. Moreover, in the case of the oversize insertion tolerance, which is necessary for a firm fit, deformations arise, such as buckling and tilting of the wheel-dish tabs, which leads to a defective, non-parallel fit between the wheel-dish tabs and the well base of the rim, the air gap which arises resulting, moreover, in welding defects. In the case of the clean surfaces required for the purpose of welding, it is virtually no longer possible to all to join the parts into one another properly, with oversize, by pressing in. In the pressing-in operation, a severe seizing of the material together with the resulting cavities and scores would occur, which would prevent a parallel fit of the dish in the rim and lead to weld defects which are the starting point for weld cracks and wheel fractures resulting therefrom. On the other hand, the seizing would lead to considerable deviations from concentric and planar running of the wheel.

OBJECT

The object of the invention is, while avoiding the above-described disadvantages, to provide a process and appropriate apparatus for producing disc wheels made, at least with regard to the rim, of sheet metal, particularly light sheet metal, with which process and apparatus the best welding conditions can be obtained, with maximum cleanness of the parts, by means of a plane-parallel firm fit between the wheel-dish tabs and the well base of the rim, with minimum deviations from concentric and planar running and maximum fatigue strength values being achieved simultaneously.

THE INVENTION

This object is achieved, with the process according to the invention, due to the fact that the rim and the wheel dish are each prefabricated with a dimension differing from the nominal diameter (oversize or undersize) such as to be assembled together in a manner free of deformation and due to the fact that the rim and the wheel dish are then, together, permanently shaped radially until the press fit is achieved.

The process according to the invention can be carried out, for example, in such a way that the rim and the wheel dish, which are each made with their diameters undersized, after being assembled together, are together expanded radially in order to achieve the required press fit, which can be obtained by means of a tool acting radially from inside and from outside. Preferably, however, the rim and the wheel dish are each prefabricated with their diameters oversize and, after they have been assembled together in a manner free of deformation, are, together, permanently shaped radially by means of a tool acting from the outside on the rim, until the desired press fit is achieved, which operation can be effected, for example, by upsetting or by means of a rolling operation. In this case, the process according to the invention can be carried out, in as especially advantageous way, so that the rim and the wheel dish are made with such relative oversized diameters that, after the rim and the wheel dish have been assembled together initially a radial air gap is present between them. The shaping operation can then be carried out in such a way that, after the air gap has been closed, the rim is upset radially onto the wheel dish and the two parts are then pressed further together in a radial direction until the wheel dish bears against an inner back-up support or the like and are permanently shaped. If the radial shaping is effected from inside outwards, with expansion of the rim, then the work can be carried out accordingly in the same way. Moreover, it is recommended to fix the wheel dish, during the shaping operation, in its position relative to the rim by means of a hold-down device.

By means of the process according to the invention, the wheel dish and the rim can be brought together, without the otherwise conventional lubrication, that is to say, with bright metal faces and with a desired firm or press fit which can subsequently be welded perfectly. At the same time, it is possible to achieve a perfect plane-parallel frictional fit of the wheel-dish tab in the well base of the rim without an air gap, coupled with a high resistance to pressing out and very good welding preconditions, the smallest possible deviations from concentric and planar running, and absence of the weld defects and scoring which are harmful to the strength of the structural part. In addition, a positive locking of the parts with one another can also be obtained during the upsetting or during their radial shaping. The process according to the invention can be introduced economically and without great expense into the production line. The air gap which is present between the rim and wheel dish before the upsetting makes it easier to automate the insertion operation.

For carrying out the process according to the invention, apparatus which is provided with an upsetting tool consisting of several segments and conforming to the contour of the rim can advantageously be used. This apparatus is designed, according to the invention, in such a way that the inner back-up support is located on a workpiece carrier which carries the wheel dish and the rim and which can be introduced into the upsetting tool, and that an elastically mounted hold-down device which is applied against the wheel dish is provided on the top plate or the like. In this case, a stroke-movable top plate which carries the workpiece carrier together with the back-up support appropriately has a wedge-ring, with a conical sliding face, which surrounds the hold-down device, whilst the multipart upsetting tool is located on a radially movable multiple tool carrier which interacts with the wedge-ring. The apparatus according to the invention is advantageously design, in this case, so that in the press stroke the tool carrier, together with the rim and the wheel dish, is first introduced into the upsetting tool and, subsequently, the hold-down plate runs against the wheel dish before the upsetting operation is carried out.

DRAWING

The invention is described in more detail below in conjunction with the exemplary embodiment, illustrated in section in the drawing, of an apparatus according to the invention. Here, the drawing shows, on the left in the picture, the situation before the upsetting operation and, on the right in the picture, after the upsetting operation has been carried out.

PREFERRED EMBODIMENT

The apparatus illustrated is provided with a base plate 10 which is fastened to the press bed and which carries via sliding segments 11 a multipart tool carrier 12 which consists of individual annular segments arranged with a peripheral spacing from one another and guide movably on the sliding segments 11 in a radial direction. The tool carrier 12 accommodates in a bearing opening a multipart upsetting tool 13 which consists, likewise, of several annular segments which are arranged in a peripheral spacing from one another and the inner contour 14 of which corresponds to the outer contour of the rim 15.

A top plate 16, stroke-movable in a vertical direction, carries a hold-down device 17 which is braced, via spring devices 18, on the top plate 16 elastically in the lifting direction. Fastened to the underside of the top plate 16 is a wedge-ring 19 which surrounds the hold-down device 17 and the annularly conical sliding face 20 of which interacts with a corresponding tapered face 21 of the annular segments of the tool carrier 12. Connected to the top plate 16 via telescopic guides 22 is a lifting cross 23 which carries in the centre a cylindrical workpiece carrier 24 to which a tool ring is fastened as back-up support 25. The workpiece carrier 24 is provided with a bearing plate 26 centered in the lifting cross 23.

The wheel dish 27 which is to be connected to the rim 15 and which is preferably made of light sheet metal is laid on the workpiece carrier 24, as illustrated in the drawing on the left-hand side of the vertical centre axis of the apparatus, so that the axial peripheral flange 27' surrounds the annular back-up support 25 with a small radial play. Thereupon, the rim 15 which is made by cold-working from sheet metal, preferably light sheet metal, is laid onto the bearing plate 26.

The rim 15 and the wheel dish 27 are each made with a slight oversize in their diameter so that when these two parts are placed on the workpiece carriers 24, 26, a small radial play also exists between the peripheral flange 27' of the wheel disc 27 and the adjacent face of the rim 15. To achieve a press fit of the wheel dish 27 within the rim 15, the top plate 16 is moved downwards, whereupon, in the first place, as illustrated in the drawing on the right of the centre axis, the hold-down device 17 is applied against the upper side of the wheel dish 27 and fixes this in its position relative to the rim during the subsequent upsetting operation. Upon the further downward movement of the top plate 16, the conical sliding face 20 of the wedge-ring 19 runs against the tapered faces 21 of the segments of the tool holder 12, as a result of which these segments of the upsetting tool 13 are pressed against the rim 15 perpendicularly to the lifting direction of the top plate, that is to say in a radial direction, as a result of which the upsetting operation is carried out.

It can be seen that, at the start of the upsetting operation, the radial play between the rim 15 and the wheel dish 27 is first cancelled and the rim 15 and the wheel dish 27 are then together shaped permanently, in the upsetting region, in a radial direction until the axial peripheral flange 27' bears on the peripheral face of the back-up support 25, as a result of which the press fit of the wheel dish within the rim is obtained. Subsequently, the rim 15 which is provided with the drawn-in wheel dish 27 can then be removed from the apparatus and the wheel dish 27 welded to the rim 15 in the conventional way.

Since both the well base rim 15 and the wheel dish 27 are made with an oversize in their diameter, it is possible to slip the rim 15 over the wheel dish 27 in a manner free of deformation. The air gap which exists between the rim and wheel dish before the upsetting makes it easier, in this case, to automate the insertion operation. By means of the process described and the apparatus which can be used for this purpose, a perfect plane-parallel frictional fit of the wheel-dish tab 27' in the well base of the rim without an air gap is obtained, a high resistance to pressing out being provided and with the smallest possible deviation from concentric and planar running of the wheel. The bright metal parts can be welded perfectly. Detrimental weld root defects and scoring are prevented. Moreover, the process described offers the possibility of carrying out, in the shaping operation, simultaneously an exact calibration or recalibration of the rim, in order to achieve a high dimensional accuracy, particularly at the seat of the tyre foot.

The preferred process according to the invention which is intended for producing wheels of light sheet metal can advantageously be applied also for the manufacture of conventional sheet steel disc wheels. The process is applicable even if only the rim consists of sheet metal such as, in particular, light sheet metal, whereas a cast part is used for the wheel dish. The permanent shaping required to achieve the press fit can be obtained, for example, by means of an upsetting or rolling operation or else by an expansion of the parts.

Having thus described my invention, I claim:

1. A process for assembling and joining together a rim and its dish into a disc wheel, wherein said rim and dish are each made from a sheet of a light metal, said process comprising the steps of:
   (a) Pre-fabricating said rim and said dish so as to be oversized in their diameter with respect to their final diameter and in such a manner that the dish and rim may be assembled together in a manner substantially free of radial deformation;
   (b) Permanently shaping the assembled dish and rim by means of a tool acting first radially inwardly on the rim, and then radially pressing the rim and dish together in said inwardly radial direction until the dish bears against an inner back-up support and a permanent press fit of the dish in the rim is achieved;
   (c) Calibrating the rim simultaneously with the said shaping of step (b) by means of said tool;
   (d) Then welding the said dish to said rim while maintaining said press fit.

2. A process as in claim 1 including the step of holding down said dish during said shaping operation (b) to fix its position relative to the rim.

3. Apparatus for joining together a light sheet metal rim and dish wherein the initial diameters of said rim and dish are such that they may be assembled substantially without deformation comprising in combination: a base; an upsetting tool, said upsetting tool consisting of several segments radially movable on said base and shaped to conform with the desired final contour of said rim; a workpiece carrier shaped to support said dish in assembled relationship with said rim during the joining operation, said inner backup support member being shaped to abut a flange on said rim to maintain the position and shape of said rim, and said bearing plate (being capable of) supporting said workpiece carrier; said bearing plate shaped to receive said rim around it (;) and sized to maintain the position of said rim with respect to the apparatus; said rim being supported by said bearing plate; said workpiece carrier being movable to carry said rim and dish into said upsetting tool, said workpiece carrier further comprising a relatively movable top plate, and a hold-down plate elastically mounted to said top plate, said hold-down plate being adapted to hold said dish in position relative to said rim during the joining and shaping operation.

4. Apparatus according to claim 3 wherein said top plate and said segments have interacting conical surfaces whereby moving the said top plate forces said segments into radial deforming engagement with said rim and dish.

5. Apparatus according to claim 4 wherein the top plate is movably connected (related) to the workpiece carrier by a telescopic guide whereby initial movement of said carrier moves said rim, dish and back-up support into the space defined by said segments and the conical surfaces subsequently move said segments into pressure deforming engagement with said rim and dish.

* * * * *